United States Patent [19]

Richards

[11] 4,275,131

[45] Jun. 23, 1981

[54] ELECTRIC STORAGE BATTERY CONTAINER

[75] Inventor: Donald K. Richards, Wyomissing Hills, Pa.

[73] Assignee: General Battery Corporation, Reading, Pa.

[21] Appl. No.: 81,225

[22] Filed: Oct. 2, 1979

[51] Int. Cl.³ .............................................. H01M 2/02
[52] U.S. Cl. ....................................... 429/163; 429/99; 429/100; 429/176
[58] Field of Search ................. 429/163, 176, 175, 99, 429/96, 100, 159; 206/333; 220/20

[56] References Cited

U.S. PATENT DOCUMENTS

| 3,741,815 | 6/1973 | Peterson | 429/100 |
| 3,904,439 | 9/1975 | Barrett, Jr. | 429/99 |
| 3,963,972 | 6/1976 | Todd | 429/97 X |
| 4,063,007 | 12/1977 | Spiegelberg | 429/176 |
| 4,160,857 | 7/1979 | Nardella et al. | 429/97 |

*Primary Examiner*—Anthony Skapars
*Attorney, Agent, or Firm*—Benasutti Associates, Ltd.

[57] ABSTRACT

A container for a lead-acid battery includes novel venting means in the form of louvers which are formed by a flange extending downward toward a tray from the perimeter of a tray cover. The flange covers and protects an open space formed between cover support members which extend upwardingly from the side walls of the tray. A novel arrangement of the battery output terminals within the container minimizes the possibility of short circuits developing between the terminals and the container.

13 Claims, 10 Drawing Figures

ELECTRIC STORAGE BATTERY CONTAINER

BACKGROUND OF THE INVENTION

This invention relates to electric storage batteries in general and more particularly to lead-acid batteries for use in motive power applications such as mining equipment, forklift trucks, and the like.

Batteries used in motive power applications are very often subjected to abuse. This is particularly true when these batteries are used to power mining equipment. Mines provide a very harsh atmosphere for equipment that is used therein. The mine atmosphere contains an abundance of dirt, rock dust, coal particles, as well as moisture and acid due to seepage. In addition, there is always the potential of a build up of explosive gases. As extreme as this environment is for the usual operating equipment, it poses very formidable problems for batteries.

When using batteries, there is always the potential for short circuits to develop which could result in the generation of sparks, flames or other hot spots which in turn could ignite in the explosive atmosphere. In a mining atmosphere, the probability of this occurring is greatly increased due to the creation of leakage paths caused by accummulations of the dirt, rock dust, coal particles, moisture and acid as well as mechanical abuses caused by physical contact with the rib timbers, lifting mechanism, cleaning tools and/or the machine itself in which the battery is used. In addition, the battery itself can contribute to the creation of a hazardous explosive atmosphere as a result of generation of hydrogen gas.

Some attempts have been made in the past to obviate the problems discussed above. For example, in order to permit the dissipation of hydrogen gas and corrosive acidic vapors, the battery tray or box incorporated a louver along one side edge thereof which proported to serve three functions: the first being to prevent the accummulation of hazardous gases within the battery box from forming by allowing these gases to be vented to the surrounding atmosphere; secondly, forming a physical barrier to prevent foreign objects, such as tools and other metallic or electrically conducted objects from entering the tray and shorting out and/or damages the cells therein; and thirdly, since at least one portion of the bottom of the louver was at substantially the same level as the top of an adjacent cell, a drain was provided for run off of water and other debris lodge cleaning.

One prior art louver was formed by creating a pair of recesses along the top edge of one side of a battery tray then bolting a flanged member across the recesses whereby a pair of elongated vents would be formed therebetween. One of the problems associated with this feature was that the flange member, by necessity, extended beyond the exterior surface of the battery tray and subsequently was prone to denting and other physical abuse which could not only deform the flange itself, it could also deform the tray which in turn could possibly cause injury to the cells therein, causing short circuits, due to rupture of the cell jar, leakage of the acid and other undesirable effects.

The prior art design for containor vents included closed corners and sides which were thought to be beneficial in that they would shield the output terminals from outside penetration. The prior art design took advantage of the situation by placing the output terminals in the closed corners for protection. This layout was also thought to have an additional beneficial effect in that it minimized the voltage between cells. This created a serious drawback however in that these closed corners and sides have the exceptional ability to collect, and successfully hold the dirt, rock dust, coal particles, moisture and acid. The result of this mixture is a conducting film covering the tray insulating material and touching the terminals. The effect of this is essentially the same as if the terminals were actually touching the tray insulation.

Additional problems were created in that, in prior art designs, the insulating material had a tendency to develop conducting paths and to peel away from the metallic tray thereby exposing the metal to the conducting film. These failures appear to be largely due to small pin holes developing in the insulating material. If there is even a minute hole, the voltage pressure, combined with the superior penetrating properties of the acid, will provide an electrical connection from the terminals to the tray. In addition, the penetrating acid tends to cause the insulating material to peel away.

As previously stated, this insulation failure is also traceable to physical contact with the rib timbers, battery cover, lifting mechanism, cleaning tools, or the machine itself. However, the greatest proportion of problems caused can be directly attributable to the magnitude of the voltage differences and conducting resistance of the leakage path. Low levels of voltage do not have the pressure necessary to supply enough current to cause problems. However, at about forty volts, the leakage becomes noticeable. The maximum voltage generally exists just before the end of the charge cycle. At this point in time, the current through all the leakage paths is the highest and the ability to generate sparks is the greatest. In addition, the hydrogen generated by the battery during charging is also produced at its maximum volume.

SUMMARY OF THE INVENTION

The present invention incorporates the following features. First, all surfaces of the tray which have any possibility of being exposed to the corrosive environment have been reduced wherever possible to the absolute minimum. This includes eliminating the tray sides above the level of the cells contained therein. Consequently, the only parts that remain above the level of the cells are those required to support the cover against any downward, crushing forces, for example those encountered when stacking batteries. Consequently, this feature of the present invention minimizes tray exposure to only those upwardly protruding vertical cover supports.

Another feature of the present invention includes lowering the internal partitions which are normally included in trays to provide torsional erode rigidity. Lowering these partitions below the tops of the cells, substantially eliminates any exposure of the surfaces thereof to the corrosive environment.

Another feature of the present invention is a rap around cover which provides terminal protection which protection was previously provided by the tray itself. In accordance with this feature, the cover is larger than the top of the tray. In position, the cover rests on the top of the upwardly protruding vertical supports. The cover has a flange around the perimeter thereof which extending down from the top surface louver and which covers the spaces between the vertical cover support when the cover is in position. The cover flanges are spaced from the exterior surfaces of the tray. This spacing provides their venting, not only on one side of the battery tray as in the prior art, but around the entire periphery of the tray. Spacer means are positioned at the corners of the container between the tray and the cover since points afford the stiffest resist external force is applied as a result of collision or other undesirable impact.

Another feature of the present invention is the physical location of the battery output in order to increase the leakage resistance between the terminals and the tray. In accordance with the present invention, the terminals has been relocated from the corners of the battery to an interior location which not only increases the leakage repath, is a safety because the terminals are removed from the periphery of the tray where most of its damage is encountered.

Another feature of the present invention is the location of the vertical cover support in relation to the cell terminals. In accordance with the present invention, these vertical cover supports are positioned such that they provide maximum resistance to leakage current and as a result are located away from, or between the terminals and that places where the voltage differential is minimal.

Another feature of the present invention enhances the adherence of a protective coating to the interior surfaces of the container which are exposed to the corrosive environment thereby minimizing the adverse effect of such environment. In accordance with the present invention, sharp corners, right angles, cracks, weld splatter, bend fractures and any other discontinuities in the adherence surface which would create excessive surface tension in the coating material have been eliminated.

Another feature of the present invention comprises controlling the placement of the protective insulating compound as well as its thickness in order to provide maximum protection to the exposed surfaces of the tray and the cells disposed therein.

Accordingly, a primary object of the present invention to minimize the short circuit faults due to physical and environmental abuse.

Another object of the present invention is to provide a battery container having superior gas venting characteristics.

A further object of the present invention is to provide a container which facilitates cleaning and removal of debris from the surfaces of the cells contained therein.

A still further object of the present invention is to provide a novel terminal arrangement which minimizes the potential of developing short circuit path between the terminals and the tray.

Yet another object of the present invention is the provision of a container which facilitates the adherence of a protective coating thereby reducing the possibility of corrosion.

These and other objects of the present invention will become apparent from the following detailed description.

DETAILED DESCRIPTION

Figure 1:
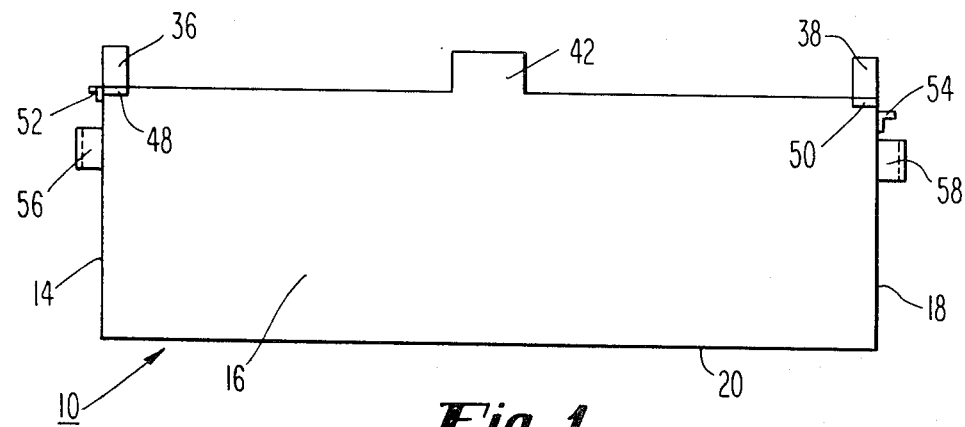
FIG. 1 is a side view of a preferred embodiment of a tray in accordance with the present invention.
Figure 2:
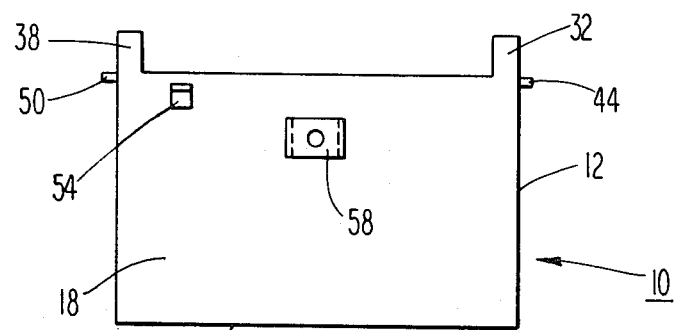
FIG. 2 is an end view of the tray shown in FIG. 1.
Figure 3:
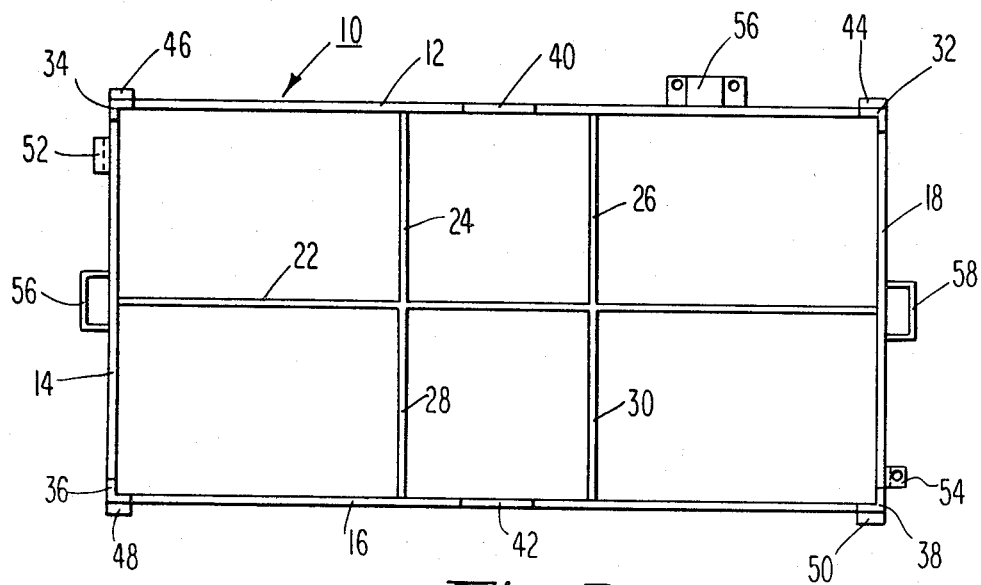
FIG. 3 is a top view of the tray shown in FIGS. 1 and 2.

Referring to FIGS. 1, 2 and 3 there is shown a tray, generally designated 10, for receiving and retaining lead-acid battery cells. The tray 10 is a box-like structure containing four side walls, 12, 14, 16 and 18 and a bottom 20. Side walls 12 and 16 will hereinafter be referred to as longitudinal side walls and side walls 14 and 18 will be referred to as lateral side walls. In the preferred embodiment, the side walls and bottom are constructed of $\frac{1}{4}$ inch sheet steel, preferably prime domestic commercial quality AISI and C-1010 hot-roll steel. In order to facilitate adherence of a protective coating on any interior surfaces of the tray which may be exposed to a corrosive environment, all internal welds preferably have a maximum radius of 0.15625 inch (5/32 of an inch) and are ground to a smooth surface. Also, the sharp interior bends at the corners of the tray shall be filled by continuous weld from the top to a predetermined distance below the top, such distance being 3 inches minimum in the preferred embodiment.

Disposed within the tray and attached to the side walls as well as the bottom by, for example welding, are a set of internal partitions which provide torsional rigidity to the tray. In the preferred embodiment, these partitions include a longitudinal partition 22 which, in the preferred embodiment, extends longitudinally across the tray; and four lateral partitions 24, 26, 28 and 30 which, in the preferred embodiment, extend laterally between the side walls and the longitudinal partition 22, as shown in FIG. 3.

Extending upward from the tops of the corners of the tray 10 are four cover support members 32, 34, 36 and 38. In the preferred embodiment, these cover support members are formed by extensions at the corners of the side walls, which extensions are, in the preferred embodiment, joined together at their adjacent edges thereby forming L-shaped cross section when viewed from the top. However, it should be noted that each of these support members could be a single extension at the corner from one side wall only the principle requirement being that each support member be sufficiently strong to support a portion of an installed tray cover as will be subsequently explained. In the preferred embodiment, there are two additional cover support members located substantially in the center of the longitudinal side walls 12 and 16. These support members are designated 32 and 34 respectively and, in the preferred embodiment, are extensions of side walls themselves.

Disposed on the outer surfaces of the lateral side walls 12 and 16, at the top edges thereof, are spacing members 44, 46, 48 and 50. In the preferred embodiment, these spacing members are steel blocks, measuring $\frac{1}{2} \times \frac{3}{4} \times 1$ inch, which are welded to the external surfaces of the longitudinal side members 12 and 16 at the top corners thereof.

Fastened to the lateral side wall 14 is a hold down member 52. In the preferred embodiment, the hold down member 52 is a section of angle, a vertical portion of which is welded to lateral side wall 14 and the horizontal portion of which engages the cover as will be subsequently described. Rigidly attached to the opposite lateral side wall 18, is a hasp member 54. The hasp member 54 is a section of angle having a hole drilled in a horizontal portion thereof. The vertical portion is welded to lateral side wall 18 in a location whereby the hole in the horizontal portion will align with a corresponding hole in a hasp member mounted on the tray cover for locking purposes as will subsequently be described.

First and second lifting lugs, 56 and 58, are rigidly attached, for example by welding, to lateral side walls 14 and 18 respectively. In the preferred embodiment, the lifting lugs 56 and 58 are sections of U-shaped steel having a hole drilled in a vertical surface thereof for mating with a lifting means. The portions forming the sides of the U-shaped member are welded, in the preferred embodiment, to the lateral side walls 14 and 18, as shown in FIGS. 1, 2 and 3.

Connected to one of the side walls, for example longitudinal side wall 12 in the preferred embodiment, is one half 56 of a cable restraining clamp. In the preferred embodiment, the cable restraining clamp member 56 is aligned with a groove at the top of the side wall 12 and is welded to the exterior surface thereof. It should be noted that the location of clamp member 56 is variable depending upon the using equipment. Consequently, the location depicted in FIG. 3 is chosen merely for purposes of illustration.

Figure 4:
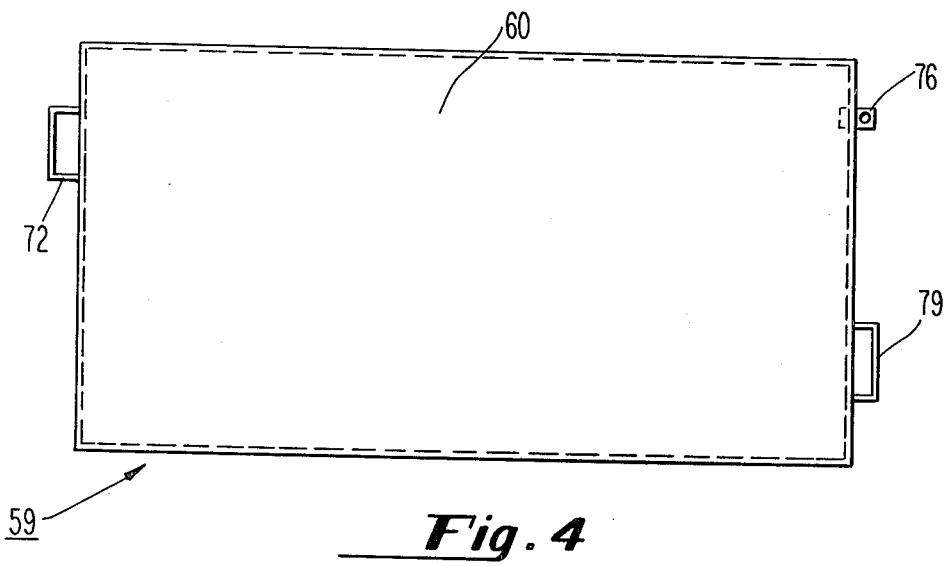
FIG. 4 is a top view of a preferred embodiment of a cover in accordance with the present invention.
Figure 5:
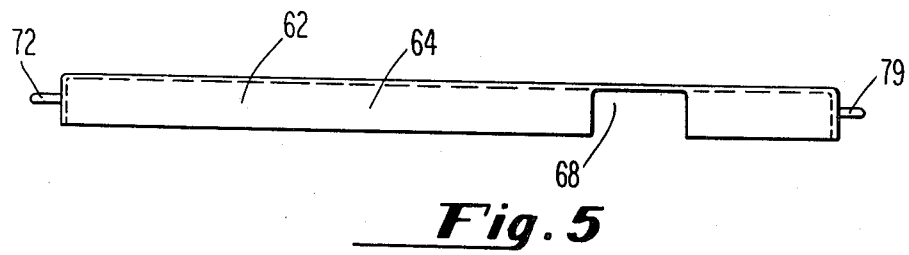
FIG. 5 is a side view of the cover shown in FIG. 4.
Figure 6:
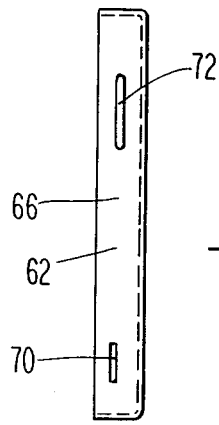
FIG. 6 is an end view of the cover shown in FIGS. 4 and 5.

Referring now to FIGS. 4, 5 and 6, there is shown a preferred embodiment of a tray cover generally designated 59. The cover 59 comprises a planar lid member 60 having a downwardly depending flange 62 extending from the perimeter thereof. For purposes of clarity of description, the flange 62 will be described as having four portions, those portions including two longitudinal flange portions 64 and two lateral flange portions 66. In the preferred embodiment, one of the longitudinal flange portions 64 has a notch 68 therein. This notch is positioned such that it is aligned with the cable restraining clamp 56 when the cover 59 is mounted on the tray 10. One lateral flange portion 66 has a slot 70 therein, the slot 70 being sized to receive the horizontal portion of the hold down member 52 therethrough, when cover is mounted on tray 10 (see FIG. 8). First and second handles 72 and 74 are attached to the lateral flange 66 as shown in FIG. 4. In the preferred embodiment, the handles are welded to their respective lateral flange portions 66 in any convenient lifting position. A second hasp member 76 is attached to a lateral flange portion 66 in a location such that it is as previously described, in alignment with the first hasp member 54 when the cover is positioned on the tray 10 whereby a lock may be inserted through the aligned holes.

Figure 8:
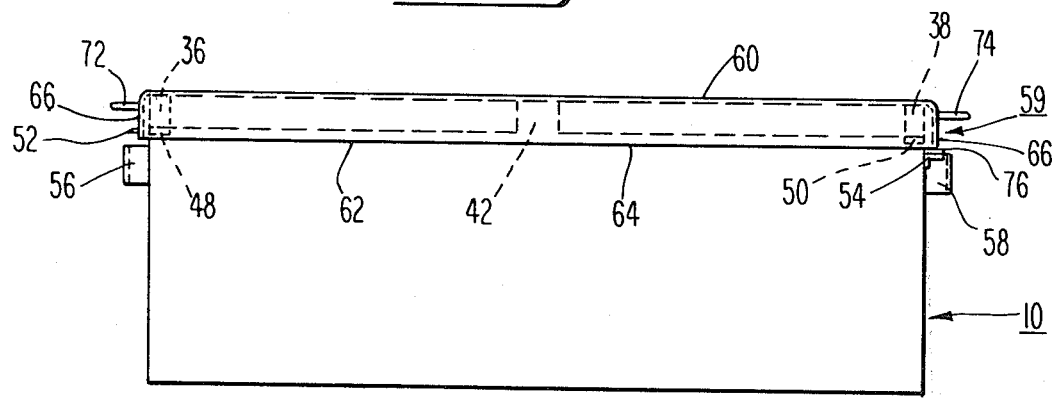
FIG. 8 is a side view of a preferred embodiment of the tray in accordance with the present invention showing the cover mounted thereon.
Figures 9, 10:
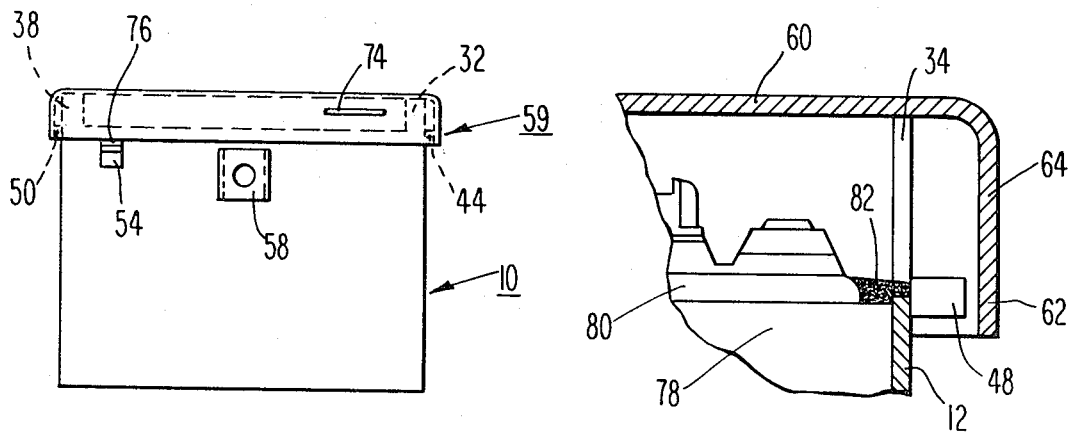
FIG. 9 is an end view of the tray and cover shown in FIG. 8.
FIG. 10 is a sectional view of one corner of the tray and cover showing the spaced relationship therebetween.

Referring now to FIGS. 8, 9 and 10, there is shown a tray having a cover 59 mounted thereon. As can be seen in FIGS. 8 and 9 and more particularly in FIG. 10, the flange 62 of the mounted cover 59 extends down over the cover support members 32, 34, 36 and 38 toward the side walls 12, 14, 16 and 18. In the preferred embodiment, the bottom of the flange overlaps the top of the side walls as shown in FIG. 10. Also as more clearly shown in FIG. 10, the flange 62 is spaced from the side walls, said spacing being maintained by spacing members 44, 46, 48 and 50. This combination of the flange 62 which extends downwardly over the cover support members and is maintained in a spaced relationship with the side walls, in effect comprises a louver type vent which extends entirely around the top of the battery container. The only interference with total unobstructed venting around the entire top of the container are the relatively narrow cover support members. Consequently, it is readily apparent that this novel feature of the present invention enables the practically unencumbered movement of air and other gasses over the tops of lead-acid battery cells which are disposed within the tray 10.

Figure 7:
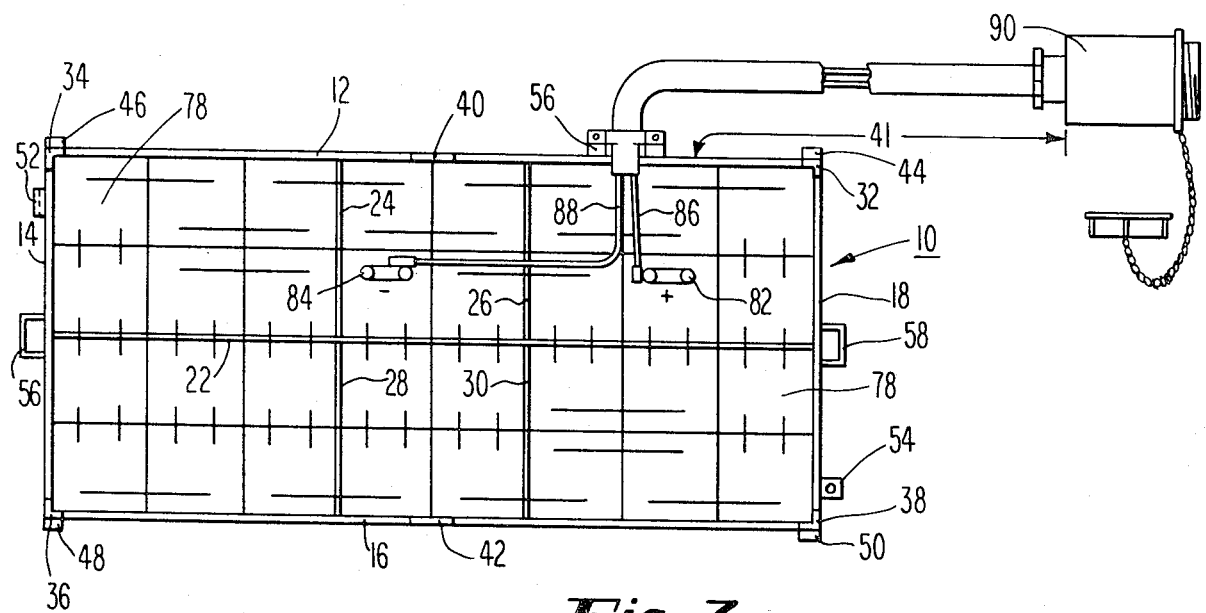
FIG. 7 is a top view of the tray shown in FIGS. 1, 2 and 3 depicting 32 cells disposed therein and schematically showing a preferred interconnection scheme in accordance with the present invention.

Referring to FIG. 7, there is shown a plurality of lead-acid battery cells 78 disposed with the tray 10. In the embodiment shown, there are thirty-two cells 78 within the tray 10. As shown more particularly in FIG. 10, the covers 80 of the lead-acid battery cells 78 are substantially coplanar with or slightly above the tops of the side walls 12, 14, 16 and 18. In addition, the tops of the internal partitions 22, 24, 26, 28 and 30 are below the level of the cell covers 80. Consequently, when a protective coating 82 is applied, it covers the tops of the internal partitions as well as any recesses between the edges of the cells 78 and the side walls such that a substantially planer surface is formed which is at the same level as or slightly higher than the lower portions of the louver vents formed by the side walls and cover flange. This feature facilitates cleaning dirt and debris from inside the battery in that a simple hosing down would normally flash such dirt and debris out through the sides of the tray. An example of a portion of such planar surface is shown in FIG. 10.

As previously stated, FIG. 7 shows a top view of a tray having thirty-two cells 78 installed therein. As is usual in cells which constitute motive type batteries, each cell has four terminals. The preferred interconnection of these terminals is shown schematically by lines in FIG. 7 which extend between the squares which represent individual cells 78. This is a preferred interconnection for a 64 volt battery, containing 32 cells. Employing the connection schematically shown in conjunction with the position of the cover support members shown in FIG. 7, it can seen that the cover support members are positioned with respect to the terminals that they are spaced as far as possible from the nearest terminals. In addition, this interconnection scheme enables the positive and negative output terminals, 82 and 84 respectively, to be positioned away from the side walls of the tray 10, thereby reducing the possibility of a short circuit path developing between these terminals and the tray itself. As also shown in FIG. 7, the positive 82 and negative 84 output terminals are connected to positive 86 and negative 88 cables respectively. The positive 86 and negative 88 cables pass through and are restrained by the cable restraining clamp member 56. The positive and negative cables 86 and 88 terminate in a desired electrical connector 90 for subsequent mating with the machine to be powered.

As can be seen by the preceeding description, the battery container of the present invention affords the following advantages. Since the spacer blocks are positioned at the corners of the tray; which points afford the stiffest resistance to external forces applied as a result of collision or other undesirable impact, bending, denting and other deformation of the tray is reduced to a minimum. Also, the wrap-around louvre cover of the present invention now provides the protection previously provided by a louver cover attached to the tray itself. Consequently, physical contact with the louvre cover which previously caused the damage to the battery tray as well as the cells contained therein, is now confined only to the cover. As a result, repairs can be easily made by simply removing the cover and hammering it out to the original shape. In addition, the novel tray/cover relationship of the present invention reduces the possibility of formation of leakage current paths between the cell terminals and the container since any build up of dirt, debris or other foreign matter automatically falls out when the cover is removed to add water to the cells. In addition, maintenance is greatly reduced because there are almost no obstructions to keep the dirt accummulation from being eliminated. Also, the wrap around louvers are safer because they allow a practically unobstructed flow-through path for the removal of gasses generated during the charging period.

The relocation of the output terminals of the battery to an interior section of the container increases the distance of any potential leakage paths between the terminals and the container. In addition, not only are the leakage paths increased, the relocation of the terminals enhances the safety of the battery by reducing the chance of arc formation due to short circuits since the terminals are now located away from the outside edges where most of the battery container damage is encountered. In addition, as was previously described, the cover support members are located so that they also provide maximum resistance to leakage currents from adjacent intercell connections.

In accordance with the present invention, not only are the welds controlled to eliminate sharp bends and protrusion, as previously described, all sharp edges and points within the container are broken and ground smooth. The surfaces are specified to be free of weld splatter or other debris, which might interfere with the protective coating or puncture cells. Steel containing surface blemishes is not used, a surface blemish being defined as a depression, pit, gouge or void in the normal steel surface more than 0.016 inch (1/64 inch) deep or an elevation, peak or ridge more than 0.016 inch (1/64 inch) above the normal surface. Consequently, the pin holes in the protective coating are reduced to a minimum which in turn enhances the adherance of the protective coating. This is particularly effective when used with the preferred coating. The preferred coating is "PROTECTACOAT", a description of which is contained in General Battery Corporation Bulletin 2-200A, which bulletin is incorporated herewith as if fully set forth herein.

Another feature of the present invention comprises controlling the placement of the coating material as well as its thickness in order to provide maximum protection. Prior art practices have been directed more towards the appearance than performance. In accordance with the present invention, the thickness has been increased to allow for the flex which would tear a thin application. The compound is also formed in order to eliminate indentation or depressions which would tend to trap or accummulate acid, dirt and/or other debris, for example in the corners of the trays. In accordance with the present invention, the compound is built up in such a manner as to afford relatively smooth, sloping surfaces which will permit the acid and other undesirable accummulation to slide off under the influence of gravity. In the preferred embodiment, the coating is performed in accordance with General Battery Corporation, Industrial Battery Division, Engineering Specification No. IB-M-1A, which specification is incorporated herewith as if fully set forth herein.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An improved container for a lead-acid battery, said container comprising:
    a. a tray for receiving at least one lead-acid battery cell therein, said tray having at least three side walls and a bottom, at least two of said side walls each having at least one cover support member extending upwardly therefrom;
    b. a cover comprising a planer lid having a downwardly depending flange along at least a portion of the perimeter thereof whereby said flange extends downwardly over said cover support members along at least a portion of each of at least two sides of said tray; and
    c. means for spacing said flange from said side walls.

2. The invention of claim 1 wherein said tray has four side walls, including two longitudinal side walls and two lateral side walls.

3. The invention in accordance with claim 2 wherein said longitudinal side walls each have three cover support members extending upwardly therefrom and said lateral side walls each have two cover support members extending upwardly therefrom.

4. The invention in accordance with claim 3 wherein each side wall has a cover support member positioned at each end of the upper edge thereof, adjacent cover support members being joined together to form a support having a substantially L-shaped cross section.

5. The invention in accordance with claim 2 wherein said flange extends completely around the perimeter of said planer lid.

6. The invention in accordance with claim 2 wherein said tray additionally includes at least one internal partition extending between opposing side walls.

7. The invention in accordance with claim 6 wherein the height of said partitions is less than the height of said battery cells.

8. The invention of claim 7 wherein the height of said side walls is no greater than the height of said lead-acid battery cells.

9. A lead-acid battery comprising:
    a. a tray for receiving at least one lead-acid battery cell therein, said tray having four side walls and a bottom, each side wall having at least one cover support member extending upwardly therefrom;
    b. a plurality of lead-acid battery cells disposed within said tray, the height of said lead-acid battery cells being no greater than the height of said side walls;
    c. a cover comprising a planer lid having a downwardly depending flange around the perimeter thereof, whereby said flange extends downwardly over said cover support members, at least to the top edge of said side walls; and d. means for spacing said flange from said side walls.

10. The invention in accordance with claim 9 wherein said tray additionally includes at least one partition extending between opposing side walls, the height of said partition being less than the height of said lead-acid battery cells disposed within said tray.

11. The invention in accordance with claim 10 wherein said battery additionally includes a protective coating which covers the internal surfaces of said cover support members as well as the exposed surfaces of said partitions.

12. The invention of claim 11 wherein output terminals of said battery are disposed inwardly from said tray side walls at a predetermined minimum distance therefrom.

13. The invention of claim 9 wherein the bottom of said flange overlaps at least a portion of the top of said side walls.

* * * * *